Figure 1:
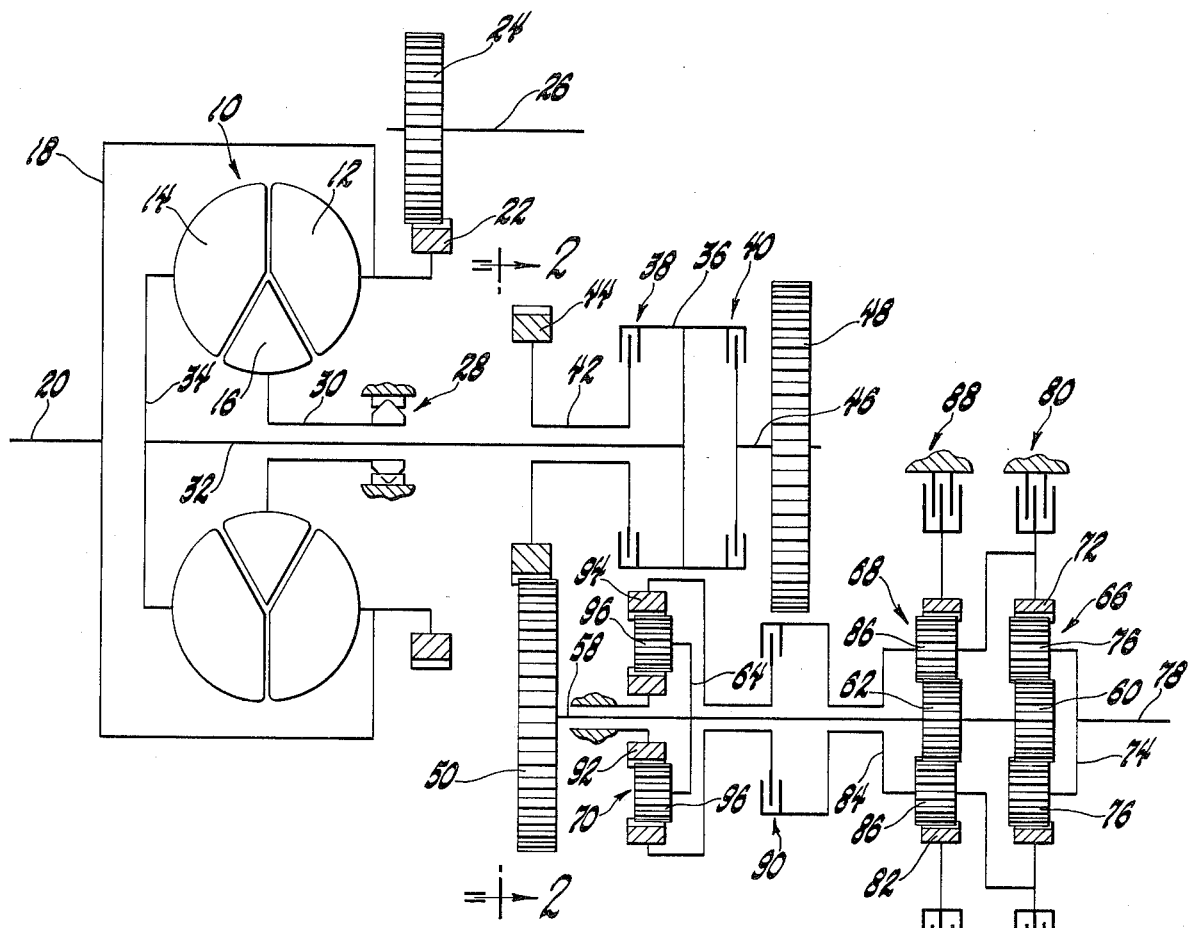

United States Patent
Polak

[11] 3,915,033
[45] Oct. 28, 1975

[54] THREE SPEED FORWARD-REVERSE PLANETARY TRANSMISSION

[75] Inventor: James C. Polak, Indianapolis, Ind.

[73] Assignee: General Motors Corporation, Detroit, Mich.

[22] Filed: Sept. 23, 1974

[21] Appl. No.: 508,044

[52] U.S. Cl. .................. 74/730; 74/705; 74/740; 74/758; 74/764
[51] Int. Cl.² .................. F16H 47/08; F16H 37/06; F16H 57/10
[58] Field of Search ............ 74/764, 765, 759, 758, 74/740, 705, 682, 730

[56] References Cited
UNITED STATES PATENTS

| | | | |
|---|---|---|---|
| 2,990,727 | 7/1961 | Miller | 74/705 X |
| 3,610,071 | 10/1971 | Tuck | 74/682 X |
| 3,815,445 | 6/1974 | Gorrell et al. | 74/764 X |

Primary Examiner—Benjamin W. Wyche
Assistant Examiner—John Reep
Attorney, Agent, or Firm—Donald F. Scherer

[57] ABSTRACT

A planetary transmission for an industrial type vehicle wherein three simple planetary gear sets, having equal size ring gears and substantially equal size sun gears, are interconnected and selectively operable to establish three speed ratios. The planetary gear sets provide two reduction working ratios with a close step therebetween and one high speed traveling ratio. A forward-reverse gear train permits equal forward and reverse ratios in the transmission such that working and traveling of the vehicle can be accomodated in both directions.

3 Claims, 2 Drawing Figures

THREE SPEED FORWARD-REVERSE PLANETARY TRANSMISSION

This invention relates to multi-speed transmissions and more particularly to planetary type gearing transmissions having working ratios and a traveling ratio.

Industrial type vehicles, such as fork lift trucks and tractors, are generally required to operate under two very distinct conditions. Primarily the vehicle must operate at fairly low vehicle speeds and high output torques during their work cycle. This occurs when the vehicle is required to move heavy loads about the work area such as a factory or storage facility. However, when the vehicle is traveling in an unloaded condition, it is desirable that a much higher traveling speed be accomplished to reduce the time spent during the non-working cycle.

The present invention provides a transmission which will permit the industrial type vehicle to perform in the above described manner. This invention combines three simple planetary gear sets with selectively operable brakes and a clutch to provide three speed and torque ratios. Two of the ratios permit a relatively low output speed and high output torque, while the third ratio establishes a high output speed and a low output torque. The planetary gear sets are operated such that a single planetary reduction drive is used in the lowest speed ratio while compound drives are established during the other two speed ratios. A forward-reverse arrangement is also incorporated in this invention such that the three planetary gear ratios can be utilized for both forward and reverse driving conditions so that the usefulness of the vehicle is not limited to one drive for vehicle movement.

It is therefore an object of this invention to provide an improved vehicle transmission wherein two working ratios and one traveling ratio is provided in both directions of vehicle movement.

It is another object of this invention to provide an improved transmission for an industrial vehicle wherein three simple planetary gear sets, having equally sized ring gears and substantially equally sized sun gears, are conditioned by three friction drive establishing devices to establish two low speed working ratios and one high speed traveling ratio.

It is another object of this invention to provide an improved industrial vehicle transmission wherein three simple planetary gear sets are interconnected such that each gear set has one member connected to the transmission input and one gear set has one member connected to the transmission output and wherein selective operation of the friction devices establishes two working ratios and one traveling ratio in the planetary gear sets and wherein the transmission input includes a forward and reverse drive arrangement such that the planetary gear ratios can be utilized by both forward and reverse operations.

Figure 2:
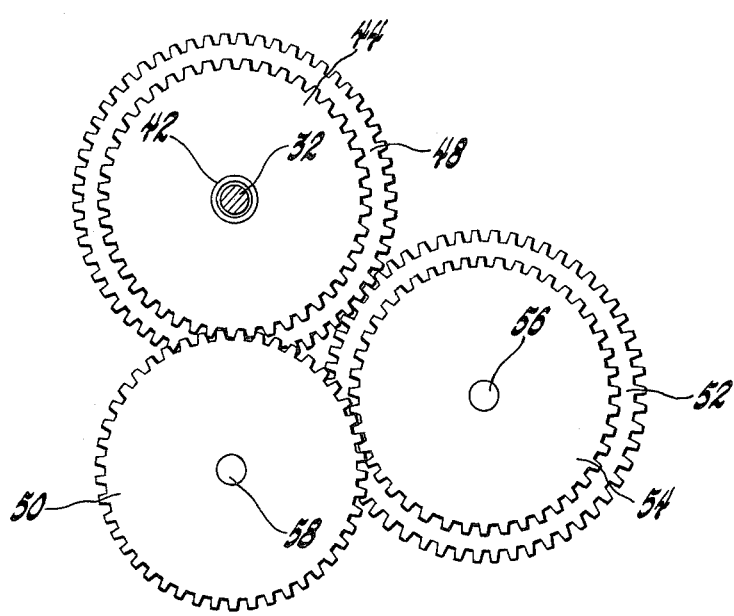

These and other objects and advantages of the invention will be more apparent from the following description and drawings wherein:

FIG. 1 is a schematic representation of a transmission incorporating the present invention; and FIG. 2 is a view of a portion of the gearing of the transmission taken along line 2—2 of FIG. 1.

Referring to the drawings wherein the same or corresponding characters represent the same or corresponding parts there is shown in FIG. 1 a torque converter 10 having an impeller 12, a turbine 14 and a stator 16 arranged in a conventional manner. The torque converter 10 may be of any conventional design. The impeller 12 is driven by a shell 18 which in turn is driven by a shaft 20 adapted to be connected to a conventional prime mover, such as an internal combustion engine. The impeller shell 18 is also secured to a spur gear 22 which meshes with a power take-off gear 24 which has secured thereto a power take-off shaft 26. The stator 16 is grounded in a well known manner through a one-way brake 28 and a sleeve shaft 30. The turbine 14 is drivingly connected to a converter output shaft 32 through a hub 34. As previously mentioned, the torque converter can be constructed in accordance with any of the well known torque converter assemblies.

The converter output shaft 32 is drivingly connected to an input shell 36 which forms the input member for a forward clutch 38 and a reverse clutch 40. The forward clutch 38 has an output member 42 secured to a spur gear 44, while the reverse clutch 40 has an output member 46 secured to a spur gear 48. The spur gear 44 meshes with a transmission input gear 50, as seen in FIGS. 1 and 2, while the spur gear 48 meshes with a reverse idler gear 52 which is drivingly connected to another idler reverse gear 54 through a shaft 56, as seen in FIG. 2. The reverse idler gear 54 meshes with the transmission input gear 50. If the forward clutch 38 is engaged, the transmission input gear 50 is driven in a forward direction, and if the reverse clutch 40 is engaged, the input gear 50 is driven in the reverse direction.

The input gear 50 is drivingly connected to a transmission input shaft 58, which shaft 58 is also drivingly connected to a sun gear 60, a sun gear 62, and a planet carrier 64. The sun gears 60 and 62 and the carrier 64 are members of planetary gear sets 66, 68 and 70 respectively. Each of the planetary gear sets 66, 68, and 70 are of the simple planetary type, that is each of these planetary gear sets has a single set of planet pinions rotatably mounted on a carrier and meshing with a sun and ring gear.

The planetary gear set 66 includes a ring gear 72, a planet carrier 74, and a plurality of planet pinions 76 rotatably mounted on the carrier 74 and meshing with the sun gear 60 and ring gear 72. The planet carrier 74 is secured to a transmission output shaft 78 which is adapted to drive the vehicle wheels, not shown. The ring gear 72 is operatively connected to a selectively operable brake 80 which brake 80 may be constructed in any of the well known manners and may be operated either mechanically, electrically, hydraulically, or pneumatically.

The planetary gear set 68 includes a ring gear 82, a carrier 84 and a plurality of planet pinions 86 rotatably mounted on the carrier 84 and meshing with the sun gear 62 and the ring gear 82. The ring gear 82 is also operatively connected to a selectively operable brake 88 which may be constructed similarly to brake 80. The carrier 84 is drivingly connected to the ring gear 72 and to a selectively operable clutch 90. The clutch 90 may be constructed in accordance with any of the well known clutch structures and may be operated similarly to brakes 80 and 88 as may clutches 38 and 40.

The planetary gear set 70 includes a sun gear 92, a ring gear 94, and a plurality of pinion gears 96 rotatably mounted on the carrier 64 and meshing with the sun gear 92, and ring gear 94. The sun gear 92 is fixed to a grounded or stationary member such as the transmission case and the ring gear 94 is drivingly connected to the clutch 90.

Assuming that the transmission input shaft 58 is being driven in either a forward or reverse direction by an engine through the torque converter 10 and the forward-reverse gearing arrangement and the brake 80 is engaged, the output shaft 78 will be driven in the same direction as the input shaft 58 through a single reduction in the planetary gearing arrangement 66. If the brake 80 is disengaged, and the brake 88 is engaged, the output shaft 78 will again be driven in the same direction as input shaft 58 at a reduction ratio determined by the planetary gear sets 66 and 68. Since the planetary gear set 68 establishes an underdrive ratio between the sun gear 62 and the carrier 84, the overall transmission ratio will be a reduction ratio.

If the brake 88 is disengaged and the clutch 90 engaged, the output shaft 78 will be driven in the same direction as the input shaft 58 at a high speed ratio determined by the combination of planetary gear sets 66 and 70. The planetary gear set 70 establishes an overdrive ratio between the input shaft 58 and the ring gear 72 of planetary gear set 66. Since the sun gear 60 is driven at input shaft speed and the ring gear 72 is driven faster than input shaft speed, the carrier 74 and therefore output 78 will be driven faster than input shaft 58.

If ring gears 72, 82, and 94 each have 54 teeth, sun gears 60, 62, and 92 have 22, 26, 26 teeth respectively the following gear ratios will result: first gear 3.45, second gear 1.93, and third gear 0.75. This will provide a step between first and second gears of 1.79 and a step between second and third gear of 2.57 resulting in an overall ratio coverage of 4.6.

The close step of 1.79 between first and second gears permit easy interchange of these two ratios, without a shiftshock, when the vehicle is working. When it is desirable to operate the vehicle in third gear the shift change from second to third gear is relatively unnoticable due to the unloaded operating condition of the vehicle at this time. In a conventional type vehicle the top speed in first gear will be approximately 4½ miles per hour, the top speed in second gear will be approximately 8 miles per hour, and the top speed in third gear will be approximately 20 miles per hour.

From the above description it can be seen that the lower two ratios provide low speed, high torque outputs which result in efficient working of the vehicle; while the third gear or top gear will provide a good traveling speed to reduce the travel time when the vehicle is moving in an unloaded condition. It should also be noted in the above example that the gear sizes are similar to conventional transmission gear sizes and can thus be manufactured on available gear cutting machinery.

Obviously, many modifications and variations of the present invention are possible in light of the above teachings. It is, therefore, to be understood that within the scope of the appended claims the invention may be practiced otherwise than as specifically described.

What is claimed is:

1. A planetary transmission for an industrial vehicle comprising in combination, an input shaft; an output shaft; a torque converter having an input member drivingly connected to said input shaft, and an output member; forward-reverse gear means for providing forward and reverse drive including a selectively engageable forward clutch and a selectively engageable reverse clutch each drivingly connected to said output member, a forward input gear drivingly connected to said forward clutch, a reverse input gear drivingly connected to said reverse clutch, and reversing gear means meshing with said reverse input gear; and planetary gearing means for providing three gear drives including a transmission input gear meshing with said forward input gear and said reversing gear means, a planetary gear input shaft drivingly connected with said transmission input gear, a first planetary gear set having a sun gear drivingly connected to said planetary gear input shaft, a carrier drivingly connected to said output shaft, a ring gear, a plurality of pinion gears rotatably mounted on said carrier and meshing with said sun and ring gears, and a selectively operable brake operatively connected with said ring gear, a second planetary gear set having a sun gear drivingly connected to said planetary gear input shaft, a carrier drivingly connected to said ring gear of said first planetary gear set, a ring gear, a plurality of pinions rotatably mounted on the carrier and meshing with the sun and ring gears, and a selectively operable brake operatively connected to the ring gear, a third planetary gear set having a sun gear held stationary, a carrier drivingly connected to said planetary gear input shaft, a ring gear, a plurality of pinions rotatably mounted on the carrier and meshing with the sun and ring gear, and a selectively operable clutch means for providing a selectively operable drive connection between the ring gear of the third planetary gear set and said ring gear of said first planetary gear set through said carrier of said second planetary gear set.

2. A planetary transmission for an industrial vehicle comprising in combination, an input shaft; an output shaft; a torque converter having an impeller member drivingly connected to said input shaft, and a turbine member; forward-reverse gear means for providing forward and reverse drive including a selectively engageable forward clutch and a selectively engageable reverse clutch each drivingly connected to said turbine member, a forward input gear drivingly connected to said forward clutch, a reverse input gear drivingly connected to said reverse clutch, and reverse gear means including first and second gears rotatably mounted parallel to said reverse input gear and said first gear meshing with said reverse input gear; and planetary gearing means disposed parallel to both said forward-reverse gear means and said reverse gear means for providing three gear drives, including an input gear meshing with said forward input gear and said second gear of said reverse gear means, a planetary gear input shaft drivingly connected with said input gear, a first planetary gear set having a sun gear drivingly connected to said planetary gear input shaft, a carrier drivingly connected to said output shaft, a ring gear, a plurality of pinion gears rotatably mounted on said carrier and meshing with said sun and ring gears, and a selectively operable brake operatively connected with said ring gear, a second planetary gear set having a sun gear drivingly connected to said planetary gear input shaft, a carrier drivingly connected to said ring gear of said first planetary gear set, a ring gear, a plurality of pinions rotatably mounted on the carrier and meshing with the sun and ring gears, and a selectively operable brake operatively connected to the ring gear, a third planetary gear set having a sun gear held stationary, a carrier drivingly connected to said planetary gear input shaft, a ring gear, and a plurality of pinions rotatably mounted on the carrier and meshing with the sun and ring gear, and a selectively operable clutch means for providing a drive connection between the ring gear of the third planetary gear set and said ring gear of said first planetary gear set through said carrier of said second planetary gear set.

3. A planetary transmission for an industrial vehicle comprising in combination, an input shaft; an output shaft; a torque converter having an input member drivingly connected to said input shaft, and an output member; forward-reverse gear means for providing forward and reverse drive including a selectively engageable forward clutch and a selectively engageable reverse clutch each drivingly connected to said output member, a forward input gear drivingly connected to said forward clutch, a reverse input gear drivingly connected to said reverse clutch, and reversing gear means meshing with said reverse input gear; and planetary gearing means for providing three gear drives including an input gear meshing with said forward input gear and said reversing gear means, a planetary gear input shaft drivingly connected with said input gear, first, second and third simple planetary gear sets each having a sun gear, a carrier member, a ring gear, and a plurality of pinion gears rotatably mounted on each of said carrier and meshing with said sun and ring gears, a first selectively operable brake operatively connected with the ring gear of said first planetary gear set, a second selectively operable brake operatively connected to the ring gear of said second planetary gear set, the sun gear of said third planetary gear set being held stationary, the sun gears of said first and second planetary gear sets and the carrier of said third planetary gear set each being drivingly connected and a selectively operable clutch means for providing a drive connection between the ring gear of the third planetary gear set and the ring gear of said first planetary gear set and the carrier of said second planetary gear set.

* * * * *